(12) United States Patent
Miyazaki et al.

(10) Patent No.: US 6,964,200 B2
(45) Date of Patent: Nov. 15, 2005

(54) LIGHT SOURCE DEVICE AND DISPLAY DEVICE

(75) Inventors: Atsushi Miyazaki, Tokyo (JP); Katsuhiko Kikuchi, Hitachinaka (JP); Masaaki Suzuki, Hitachinaka (JP); Ryozo Tomosaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/469,387

(22) PCT Filed: Mar. 29, 2001

(86) PCT No.: PCT/JP01/02622

§ 371 (c)(1),
(2), (4) Date: Aug. 29, 2003

(87) PCT Pub. No.: WO02/075207

PCT Pub. Date: Sep. 26, 2002

(65) Prior Publication Data

US 2004/0055387 A1 Mar. 25, 2004

(51) Int. Cl.[7] ................................................. G01L 9/00
(52) U.S. Cl. ............................................. 73/754; 73/756
(58) Field of Search .................................... 73/700–756

(56) References Cited

U.S. PATENT DOCUMENTS 5,747,694 A 5/1998 Baba et al.
5,948,991 A 9/1999 Nomura et al.
6,470,739 B1 * 10/2002 Matsumura et al. ........ 73/118.2

FOREIGN PATENT DOCUMENTS

| JP | 6-273248 | 9/1994 |
|---|---|---|
| JP | 6-84918 | 10/1994 |
| JP | 9-178591 | 7/1997 |
| JP | 10-115536 | 5/1998 |
| JP | 10-153507 | 6/1998 |
| JP | 11-295174 | 10/1999 |

* cited by examiner

Primary Examiner—William Oen
Assistant Examiner—Jermaine Jenkins
(74) Attorney, Agent, or Firm—Crowell & Moring LLP

(57) ABSTRACT

The invention is intended to provide a small and highly reliable pressure sensor, which has a smaller number of components and can be produced by using a mold for resin molding in common. A sensor unit (11) is molded with resin and includes a semiconductor chip (1) for converting the change in pressure of a medium introduced through an introduction hole for measurement into an electric signal. A lead member (12) has one end exposed in a connector (23) and is electrically connected to the semiconductor chip (1) in the sensor unit (11) beforehand. Pressure is applied to the semiconductor chip (1) through a pipe (22). An outer case (21) is integrally formed of synthetic resin by insert molding of the sensor unit (11), the lead member (12) and the pipe (22).

11 Claims, 5 Drawing Sheets

US 6,964,200 B2

LIGHT SOURCE DEVICE AND DISPLAY DEVICE

TECHNICAL FIELD

The present invention relates to a semiconductor pressure sensor, and more particularly to a semiconductor pressure sensor with a sensor unit built therein.

BACKGROUND ART

As described in, e.g., JP,A 9-178591, one conventional pressure sensor is constructed as follows. An outer casing unit comprises a connector section (1f) integrally formed with a connector terminal for electrical connection to the exterior, a frame (1d) having openings positioned in opposed two directions, a resin-made housing (5a) having a tubular pressure introducing section, which is projected from the inner side and is provided to orient in a direction toward the opening, a first resin-made cover (4) provided with a mount portion for mounting to the exterior, and a second resin-made cover (5) provided with a pressure introducing pipe. A sensor unit is constituted as a case including therein a semiconductor chip for converting pressure into an electric signal, the case being provided with a lead terminal for electrical connection to the exterior and a pressure introducing pipe. The sensor unit and the outer casing unit are assembled through the steps of bonding the sensor unit to the pressure introducing section of the housing, electrically connecting the lead terminal of the sensor unit to the connector terminal, assembling the first cover to the housing through a rubber-made packing, pouring a potting agent in a space, which is surrounded by the housing and the first cover and in which the sensor unit is disposed, and assembling the second cover to the housing with an adhesive, followed by thermo-setting of a resulting assembly.

With such a construction, however, because the outer casing unit is made up of a plurality of resin components, molds and molding steps for manufacturing the individual components are required, and an increased number of steps is also required for assembling the sensor unit and a group of those components of the outer casing unit. Accordingly, an increase of the cost is unavoidable. Another problem is that, because the number of joints is increased, a risk potential of failures possibly occurred while being handled in the market also increases. Furthermore, because the connector terminal for electrical connection to the exterior is integrally molded in the housing resin beforehand and a lead terminal joint portion of the sensor unit is projected into the housing frame, there is a limit in reducing the housing size. In addition, to tightly hold the joint between the lead terminal and the connector terminal, the steps of pouring and hardening a silicone resin and a potting agent are required, thus resulting in an increase of the cost.

Meanwhile, as described in, e.g., JP,B 6-84918, there is known a structure in which a pressure sensor unit (1) and a metal case (4) containing an IC (2) therein are integrally molded with a resin case (5). With such a structure, manufacturing steps can be simplified and the cost can be reduced.

DISCLOSURE OF THE INVENTION

In the structure described in JP,B 6-84918, however, a pressure introducing section (5a) for introducing pressure to the sensor unit from the exterior is also integrally formed with the resin case (5). Generally, the outer diameter and the length of the pressure introducing section differ for each of users depending on, for example, the place where the pressure sensor is used. Therefore, the structure in which the pressure introducing section (5a) is integrally formed with the resin case (5), as described in JP,B 6-84918, requires the pressure introducing section to have dimensions and a shape in accordance with a user demand. This requirement has raised a problem that a plurality of molds must be prepared in accordance with individual user demands and the common use of a mold cannot be realized, thus resulting in an increase of the cost.

A first object of the present invention is to provide a small and highly reliable semiconductor pressure sensor, which has a smaller number of components and can be produced using a mold for resin molding in common.

A second object of the present invention is to provide a small and highly reliable semiconductor pressure sensor with an integral temperature sensor, which has a smaller number of components.

To achieve the above-mentioned first object, the present invention provides a semiconductor pressure sensor comprising a resin-molded sensor unit with a built-in semiconductor chip for converting a pressure change of a fluid to be measured, which is introduced through an introduction hole, into an electric signal; a lead member having one end exposed in a connector, the lead member being electrically connected to the semiconductor chip in the sensor unit beforehand; a pressure introducing pipe for introducing pressure to the semiconductor chip; and an outer case integrally formed of a synthetic resin material by insert molding of the sensor unit, the lead member, and the pressure introducing pipe.

With that construction, a small and highly reliable pressure sensor can be obtained which has a smaller number of components and can be produced by using a mold for resin molding in common.

Also, to achieve the above-mentioned second object, the present invention provides a semiconductor pressure sensor comprising a resin-molded sensor unit with a built-in semiconductor chip for converting a pressure change of a fluid to be measured, which is introduced through an introduction hole, into an electric signal; a lead member having one end exposed in a connector, the lead member being electrically connected to the semiconductor chip in the sensor unit beforehand; a pressure introducing pipe for introducing pressure to the semiconductor chip; a temperature sensor for converting a temperature change of the fluid to be measured into an electric signal; lead terminals for holding the temperature sensor; and an outer case integrally formed of a synthetic resin material by insert molding of the sensor unit, the lead member, and the pressure introducing pipe while the lead terminals and the lead member are electrically joined to each other.

With that construction, a small and highly reliable semiconductor pressure sensor with an integral temperature sensor can be obtained which has a smaller number of components.

BEST MODE FOR CARRYING OUT THE INVENTION

A construction of a semiconductor pressure sensor according to a first embodiment of the present invention will be described below with reference to FIGS. 1 and 2.

Figure 1:
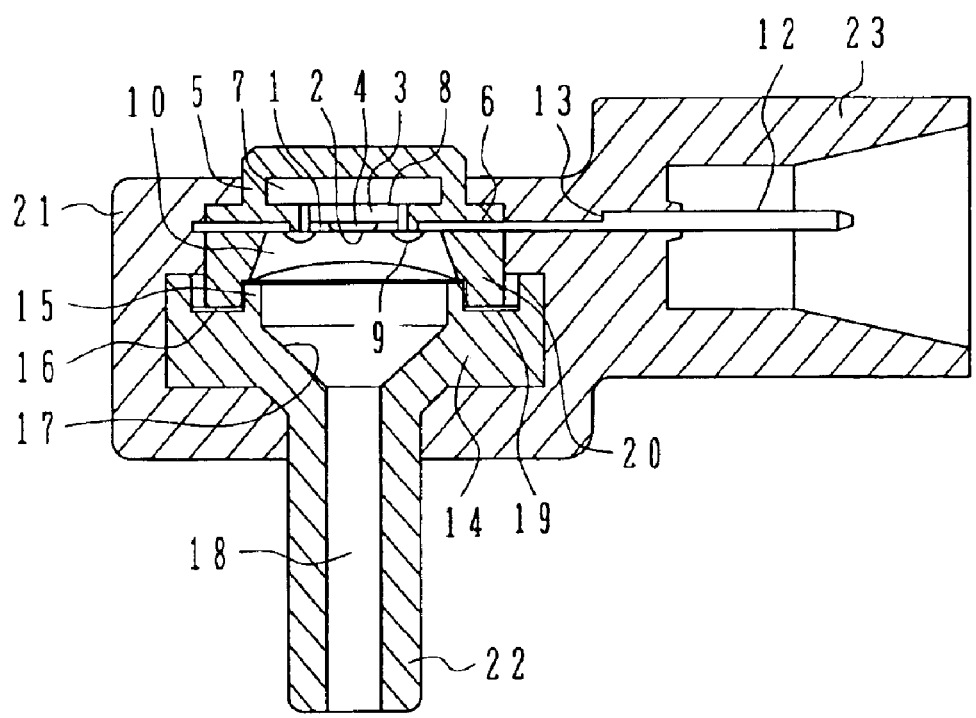
FIG. 1 is a sectional view showing a construction of a semiconductor absolute pressure sensor according to a first embodiment of the present invention.

FIG. 1 is a sectional view showing a construction of a semiconductor absolute pressure sensor according to a first embodiment of the present invention. FIG. 2 is a plan view of the semiconductor pressure sensor of FIG. 1.

A semiconductor chip 1 is made of silicon. A lower surface of a central portion of the semiconductor chip 1 is recessed by etching, for example, so as to form a thin-wall diaphragm 2 in the central portion. A pressure detecting circuit, not shown, is integrally formed by a semiconductor process on an upper surface of the semiconductor chip 1 in an area corresponding to the diaphragm 2. The pressure detecting circuit is made up of four diffused resistors formed on the diaphragm 2 and is constituted in a pattern of bridge wired using aluminum conductors.

Further, a characteristic compensating circuit and a protection circuit, both not shown, are integrally formed by a semiconductor process on the upper surface of the semiconductor chip 1 in an area around the diaphragm. The characteristic compensating circuit is a digital-analog composite circuit for adjusting the relationship between pressure and output to a predetermined transfer function. The digital-analog composite circuit mainly comprises a digital section having an EPROM to store and hold characteristic adjustment signals, and an analog section for amplifying a signal. The characteristic adjustment signals represent adjustment values, such as coefficient values for adjusting various characteristics of zero-span, sensitivity and temperature, which are obtained in the adjustment of those characteristics. The protection circuit is a circuit which is disposed in an input/output stage connected to the exterior and ensures protection of input/output signals. The pressure detecting circuit, the characteristic compensating circuit, and the protection circuit are electrically connected to each other using, e.g., aluminum wires.

The semiconductor chip 1 is joined to a glass base 3 by anodic bonding, for example. The semiconductor chip 1 and the glass base 3 jointly constitute a chip assembly. A vacuum chamber 4 is defined as a space sandwiched by a lower surface of the diaphragm 2 in the semiconductor chip 1 and an upper surface of the glass base 3. The linear expansion coefficient of the glass base 3 is selected substantially equal to that of the semiconductor chip 1.

A chip case 5 is formed of an epoxy resin by insert molding of lead terminals 6 and a reinforcing plate 7. The lead terminals 6 are each formed of phosphor bronze. The reinforcing plate 7 has a circular shape and is made of 42-Alloy. A central upper surface of the reinforcing plate 7 insert-molded in the chip case 5 is exposed from the chip case 5. The lead terminals 6 are arranged around an area in which the chip assembly is disposed, and are withdrawn out to the exterior through the chip case 5. The chip assembly comprising the semiconductor chip 1 and the glass base 3 is fixedly bonded by a silicone adhesive 8 to the reinforcing plate 7 exposed in the central portion of the chip case 5.

Electrodes of the semiconductor chip 1 are connected respectively to the lead terminals 6 by wire bonding using aluminum wires 9. A fluorosilicone- or fluoro-based coating gel 10 is filled and hardened over the chip assembly of the semiconductor chip 1 and the glass base 3, which is mounted onto the reinforcing plate 7 in the chip case 5. The coating gel 10 serves to transmit pressure to the semiconductor chip 1 and to prevent corrosive liquids and gases from contacting with both the semiconductor chip 1 and the silicone adhesive 8.

Thus, a sensor unit 11 comprises the chip assembly of the semiconductor chip 1 and the glass base 3, and the chip case 5 integrally molded with the reinforcing plate 7 and the lead terminals 6. The characteristic adjustment is performed on the sensor unit 11 alone by applying a predetermined pressure and temperature and then storing and holding characteristic adjustment values in the semiconductor chip 1 through the lead terminals 6.

Connector terminals 12 are integrally formed with the lead terminals 6 of the sensor unit 11. Because the connector terminals 12 and the lead terminals 6 differ in plate thickness from each other, there is a step 13 between both the terminals.

A pipe 22 is made of PBT. The pipe 22 has a ring surface 15 projecting on one side thereof and a ring surface 16 positioned around the ring surface 15 at a lower level than it. A conical-shaped passage 17 and a straight passage 18 are formed inside the pipe 22. The straight passage 18 constitutes a pressure introducing pipe.

The conical-shaped passage 17 is formed so that not only a liquid having entered, along with a medium to be measured, the interior of a pressure detecting chamber, in which the semiconductor chip 1 of the sensor unit is disposed, but also water droplets generated in the pressure detecting chamber upon dew condensation are forced to easily flow out to the exterior when the semiconductor pressure sensor is mounted with its pressure introducing hole oriented to face downward. When the semiconductor pressure sensor is mounted in a position deflected to one side, a similar advantage can also be obtained by modifying the passage of the pipe 22 from the conical shape into a tapered shape on one side.

A ring-shaped film pellet 19 made of an epoxy resin is fitted over the ring surface 16 of the pipe 22. The sensor unit 11 is mounted to the pipe 22 such that a ring surface 20 projected on the opening side of the sensor unit 11 is brought into contact with the film pellet 19. A resulting assembly is set in a mold used for molding an outer case 21, and the outer case 21 is molded using PBT. The outer case 21 comprises a connector coupler 23 and a flange 24 provided with a mount hole, which are integrally formed by molding. A pressure introducing pipe section is of an integral structure in which the pipe 22 is projected out of the outer case 21.

The sensor unit 11 and the pipe 22 are hermetically sealed off at a joint between them with the film pellet 19 fused for bonding at the joint during the molding, and they are fixed inside the outer case 21 with a PBT resin.

The pipe 22 is made of PBT of such a grade as improving adhesion in multiple molding and has a labyrinth structure including a plurality of projections, not shown, which are formed in a contact surface of the pipe with the PBT resin of the outer case 21 for the purpose of increasing the fusion ability. During the molding step, the projections of the labyrinth structure are fused to ensure air tightness and fast adhesion.

The outer case 21 is formed by integrally molding the connector coupler 23 having an inner space, in which one ends of the connector terminals 12 are exposed, and the flange 24 provided with the mount hole. The flange 24 has a brass-made collar 25 insert-molded in the mount hole. The collar 25 is used when mounting the semiconductor pressure sensor to a metal surface of a throttle body, for example, by using a screw. When the semiconductor pressure sensor is mounted using a resin surface, the collar 25 is not necessary and hence obviated in the molding step.

By holding a pin attached in the mold so as to close the pressure introducing hole of the pipe 22 during the molding, a tubular passage communicating the pressure introducing pipe with the interior of the semiconductor pressure sensor is constituted after the molding. It is therefore possible to introduce the fluid to be measured and to perform pressure detection by the semiconductor chip 1.

An outer peripheral portion 26 of the pressure sensor unit 11 on the side where the semiconductor chip 1 is fixed is exposed from the outer case 21. Because the sensor unit 11 is already subjected to the characteristic adjustment at this point of time, the characteristics of the semiconductor chip 1 must be prevented from changing due to the injection pressure generated in the molding step and shrinkage stresses of the resin. The molding is performed to avoid the resin from directly covering the outer peripheral portion 26 of the sensor unit 11 on the fixed side of the semiconductor chip 1 so that stresses received from the resin will not directly be imposed on the outer peripheral portion on the fixed side of the semiconductor chip 1.

Further, the chip case 5 of the sensor unit 11 is made of a highly elastic epoxy resin containing about 80% of filler, and has a stress-free structure in which the metal reinforcing plate 7 integrally molded with the resin is included in the chip case 5 and the semiconductor chip 1 is disposed over the metal reinforcing plate 7 with the glass base 3 between them while the silicone adhesive 8 having lower elasticity is interposed between the metal reinforcing plate 7 and the glass base 3. Accordingly, no shifts occur in characteristics even after the outer case 21 is integrally formed with the sensor unit 11 by insert molding.

With this embodiment, since the pressure sensor is constituted by integrally molding the sensor unit and the pipe serving as the pressure introducing pipe with the outer case, the pipe serving as the pressure introducing pipe can be produced as a separate member. As a result, when the dimensions of the pressure introducing pipe, such as the outer diameter and the length, differ depending on the individual user's demands, the sensor unit and the mold used for molding the pressure sensor can be used in common merely by modifying only the pipe depending on the individual user's demands.

Also, by employing the above-described method of assembling the outer case 21 and the sensor unit 11, a component, such as a housing or a cover, and the steps of applying and hardening an adhesive and/or the steps of pouring and hardening a potting material, which have been required in the past, are no longer required, thus resulting in a reduction of the cost.

Further, because of no joints between the components using an adhesive, a bonding groove, which has been required in the past in an outer peripheral portion of the housing, is no longer required, thus resulting in a reduction of both the size and the weight of the outer case. Additionally, reliability is increased because of no risk potential of bonding failures.

Still further, since the lead terminals 6 of the sensor unit 11 are integrally formed with the connector terminals 12, a later step for connecting both the terminals to each other by welding, for example, is no longer required. Since the integral terminals are directly fixed in the outer case by using resin, it is possible to further reduce both the size and the weight of the outer case.

Still further, since the sensor unit, the pipe, and the outer case can be all made of resin, the total sensor weight can be reduced. Moreover, since the pressure sensor can be formed of resin by two-stage molding, the sensor size can be further reduced.

Next, a construction of a semiconductor pressure sensor according to a second embodiment of the present invention will be described with reference to FIG. 3.

Figure 3:
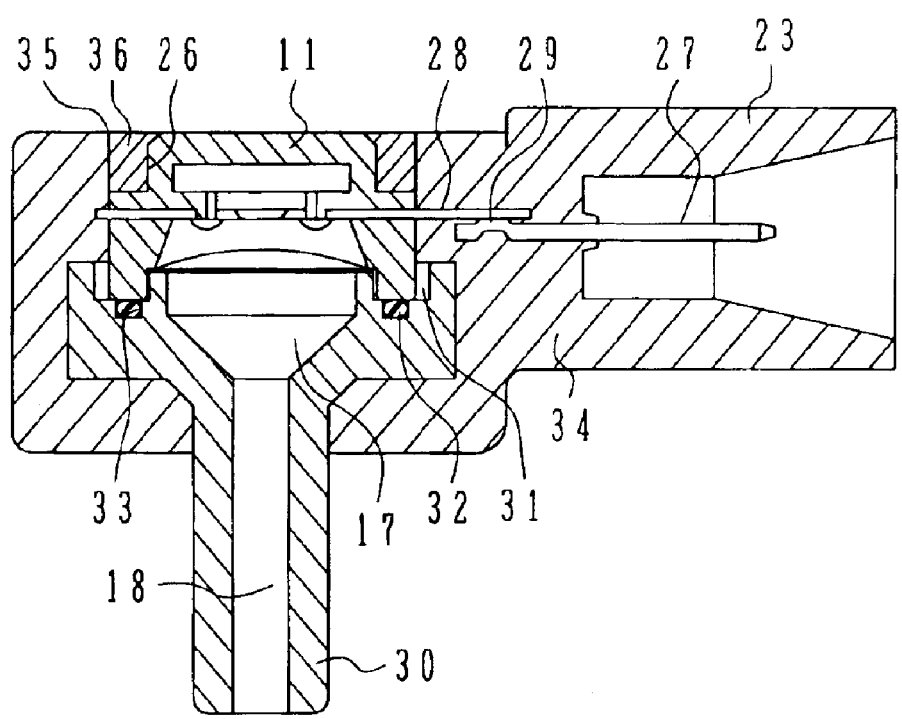
FIG. 3 is a sectional view showing a construction of a semiconductor absolute pressure sensor according to a second embodiment of the present invention.

FIG. 3 is a sectional view showing a construction of a semiconductor absolute pressure sensor according to a second embodiment of the present invention. Note that the same characters as those in FIG. 1 denote the same components.

In this embodiment, connector terminals 27 are separate from lead terminals 28 of the sensor unit 11 and are connected to them by tie bars not shown. Each of the connector terminals 27 is provided with a boss 29 for projection welding. The connector terminals 27 are made of phosphor bronze. After the connector terminals 27 have been welded to the corresponding lead terminals 28 of the sensor unit 11, the tie bars are cut.

With this embodiment, since the connector terminals 27 and the lead terminals 28 are separate from each other, the sensor unit 11 can be standardized. Practically, dimensions of the connector terminals 27 differ in some cases depending on individual user's demands. Even in those cases, the sensor unit 11 can be used in common and can be assembled and adjusted alone.

When the lead terminals are integrally formed with the connector terminals having a thickness and a layout which differ depending on users, the number of kinds of components to be managed is increased and step replacement of, e.g., a platen is required because of the difference in shape. Further, since the size of the sensor unit is increased with the presence of the connector terminals connected to the lead terminals, the sensor unit is more difficult to handle and the size of an apparatus for handling the sensor unit is also increased correspondingly. In contrast, in this embodiment, since the connector terminals 27 are separate from the lead terminals 28, the sensor unit can be used in common, and the individual user's demands can easily be satisfied just by modifying the connector terminals only.

A pipe 30 is made of PBT. The pipe 30 has a first recessed ring groove 31 formed in its one end surface. A second recessed ring groove 32 is formed in the recessed ring groove 31. A conical-shaped passage 17 and a straight passage 18 are formed inside the pipe 30. The straight passage 18 constitutes a pressure introducing pipe. An O-ring 33 made of fluoro-based rubber is fitted to the second recessed ring groove 32 of the pipe 30, and a projected ring surface of the sensor unit 11 on the opening side is fitted to the first recessed ring groove 31. After setting a resulting assembly in a mold for forming an outer case 34, a molding step is performed in the state in which the sensor unit 11 and the pipe 30 are vertically pressed in opposed directions. As a result, a joint between the sensor unit 11 and the pipe 30 is hermetically sealed off by the O-ring 33, and they are fixed as an integral unit.

Figure 2:
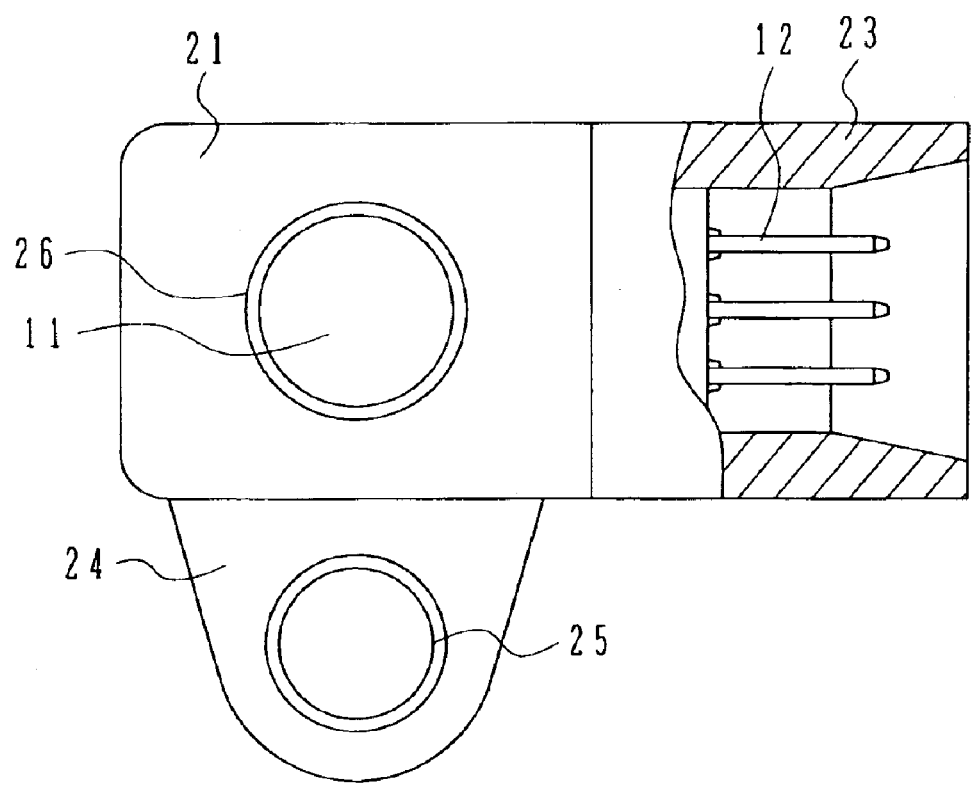
FIG. 2 is a plan view of the semiconductor pressure sensor of FIG. 1.

An outer case 34 is formed by integrally molding a connector coupler 23 and a flange 24 provided with a mount hole shown in FIG. 2. A pressure introducing pipe section is constituted by integrally molding the pipe 30 with the outer case such that the pipe 30 is projected out of the outer case.

A recessed ring groove 35 is formed at an outer peripheral portion 26 of the sensor unit 11 on the chip fixed side so as to surround an exposed portion of the sensor unit 11, thereby providing a structure in which the outer peripheral portion 26 is not directly covered with resin. By pouring and hardening a silicone adhesive 36 having lower elasticity in the recessed ring groove 35 after the molding, the recessed ring groove 35 can be filled without applying stresses to the outer peripheral portion 26 of the sensor unit 11 on the chip fixed side.

With this embodiment, since the connector terminals and the lead terminals are separate from each other, the sensor unit can be used in common. Therefore, the individual user's demands can easily be satisfied just by modifying the connector terminals only.

Also, since the pressure sensor is constituted by integrally molding the sensor unit and the pipe serving as the pressure introducing pipe with the outer case, the pipe serving as the pressure introducing pipe can be produced as a separate member. As a result, when the dimensions of the pressure introducing pipe, such as the outer diameter and the length, differ depending on the individual user's demands, the sensor unit and the mold used for molding the pressure sensor can be used in common merely by modifying only the pipe depending on the individual user's demands.

Further, by employing the above-described method of assembling the outer case 34 and the sensor unit 11, a component, such as a housing or a cover, and the steps of applying and hardening an adhesive and/or the steps of pouring and hardening a potting material, which have been required in the past, are no longer required, thus resulting in a reduction of the cost.

Still further, because of no joints between the components using an adhesive, a bonding groove, which has been required in the past in an outer peripheral portion of the housing, is no longer required, thus resulting in a reduction of both the size and the weight of the outer case. Additionally, reliability is increased because of no risk potential of bonding failures.

Still further, since the sensor unit, the pipe, and the outer case can be all made of resin, the total sensor weight can be reduced. Moreover, since the pressure sensor can be formed of resin by two-stage molding, the sensor size can be further reduced.

Next, a construction of a semiconductor pressure sensor according to a third embodiment of the present invention will be described with reference to FIG. 4.

Figure 4:
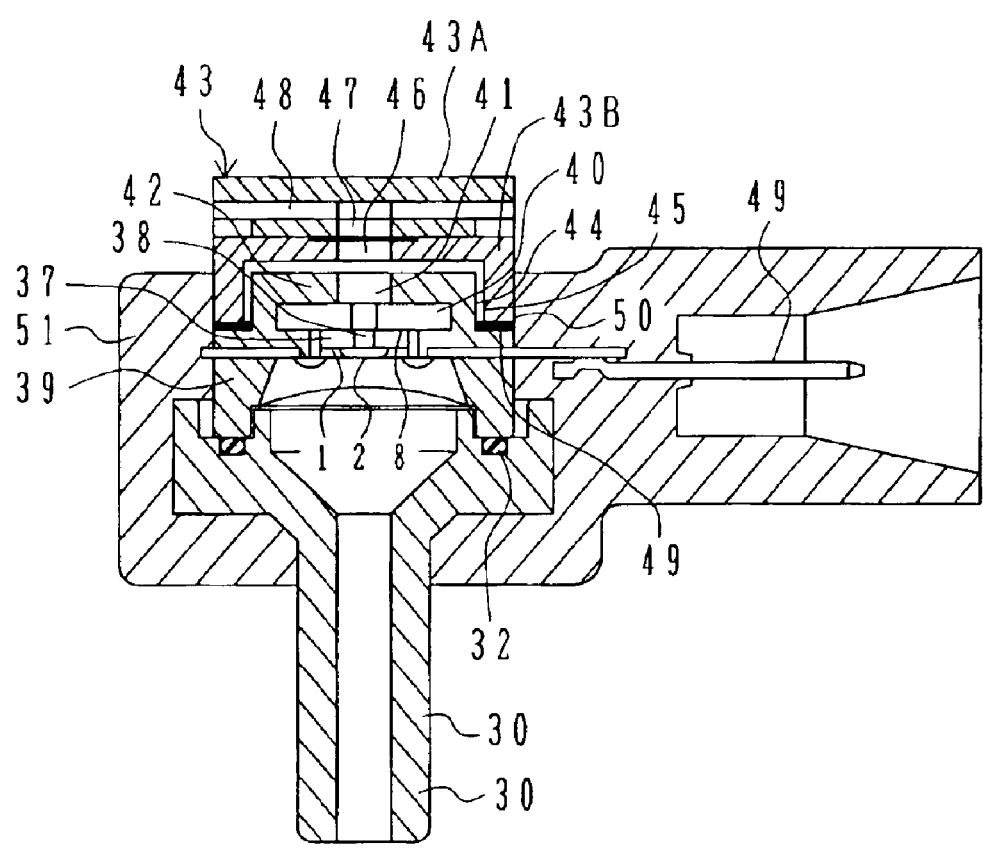
FIG. 4 is a sectional view showing a construction of a semiconductor relative pressure sensor according to a third embodiment of the present invention.

FIG. 4 is a sectional view showing a construction of a semiconductor relative pressure sensor according to a third embodiment of the present invention. Note that the same characters as those in FIG. 1 denote the same components.

A glass base 37 has a through hole 38 formed in its central portion. A chip case 39 has a through hole 41 for communicating a central portion of a reinforcing plate 40 with the outer side of the chip case. A sensor unit 42 is constructed by bonding a chip assembly, which is prepared by joining the semiconductor chip 1 to the glass base 37, to reinforcing plate 40 with a silicone adhesive 8 such that the through hole 38 of the chip assembly communicates with the through hole 41 of the chip case 39.

A cap 43 comprises a first cap 43A, a second cap 43B, and a Goretex seal 47. The cap 43 is constructed by bonding the first cap 43A and the second cap 43B to each other with the Goretex seal 47 interposed therebetween. The cap 43 has an inner concave portion 45 in a complementary match with an outer convex portion 44 of the sensor unit 42 on the side where the through hole 41 is formed, and an introduction hole 46 formed at the center of the cap for communication with the exterior. The Goretex seal 47 is disposed midway the introduction hole 46, and a labyrinthine atmosphere introducing hole 48 is formed in the cap for communication with the exterior.

After joining the sensor unit 42 to connector terminals 27 by projection welding, a resulting assembly is disposed on a pipe 30 through an O-ring 32. Then, a film pellet 50 is placed on an outer peripheral ring surface 49 of the outer convex portion 44 of the unit case 42, and the cap 43 is disposed to fit over the film pellet 50. These assembled components are set in a mold for molding an outer case 51 and are molded with the outer case 51 using PBT.

The sensor unit 42 and the cap 43 are hermetically sealed off at a joint between them with the film pellet 50 fused for bonding at the joint during the molding, and they are fixed within the outer case 51 using a PBT resin.

The pressure of a medium to be measured, which is introduced through the pressure introducing pipe 30, is applied to an upper surface of the semiconductor chip 1, and the atmospheric pressure is applied to a lower surface of the semiconductor chip 1 through the atmosphere introducing hole 48 of the cap 43. Correspondingly, a diaphragm 2 deforms depending on the differential pressure between the pressure of the medium to be measured and the atmospheric pressure. In other words, a relative pressure with the atmospheric pressure being a reference can be detected.

More specifically, the outer case 51 of the relative pressure sensor of this embodiment and the outer case 34 of the absolute pressure sensor shown in FIG. 3 are the same except for the presence or absence of the cap 43. Therefore, the mold can be used in common just by replacing an insert element to modify a portion for holding the cap 43. As an alternative, the same structure as that of FIG. 4 can also be obtained by integrally forming the sensor unit 42 using the mold for forming the outer case of FIG. 3 without replacing the insert element, and then bonding the cap 43 in a later step.

With this embodiment, since the relative pressure sensor has the same structure as that of the absolute pressure sensor except for the presence or absence of the cap, both the sensors can be formed using the same mold just by replacing the insert element of the mold used in the molding step.

Also, since the connector terminals and the lead terminals are separate from each other, the sensor unit can be used in common. Therefore, the individual user's demands can easily be satisfied just by modifying the connector terminals only.

Further, since the pressure sensor is constituted by integrally molding the sensor unit and the pipe serving as the pressure introducing pipe with the outer case, the pipe serving as the pressure introducing pipe can be produced as a separate member. As a result, when the dimensions of the pressure introducing pipe, such as the outer diameter and the length, differ depending on the individual user's demands, the sensor unit and the mold used for molding the pressure sensor can be used in common merely by modifying only the pipe depending on the individual user's demands.

Still further, by employing the above-described method of assembling the outer case 51 and the sensor unit 42, a component, such as a housing or a cover, and the steps of applying and hardening an adhesive and/or the steps of pouring and hardening a potting material, which have been required in the past, are no longer required, thus resulting in a reduction of the cost.

Still further, because of no joints between the components using an adhesive, a bonding groove, which has been required in the past in an outer peripheral portion of the housing, is no longer required, thus resulting in a reduction of both the size and the weight of the outer case. Additionally, reliability is increased because of no risk potential of bonding failures.

Still further, since the sensor unit, the pipe, and the outer case can be all made of resin, the total sensor weight can be reduced. Moreover, since the pressure sensor can be formed of resin by two-stage molding, the sensor size can be further reduced.

Next, a construction of a semiconductor pressure sensor according to a fourth embodiment of the present invention will be described with reference to FIG. 5.

Figure 5:
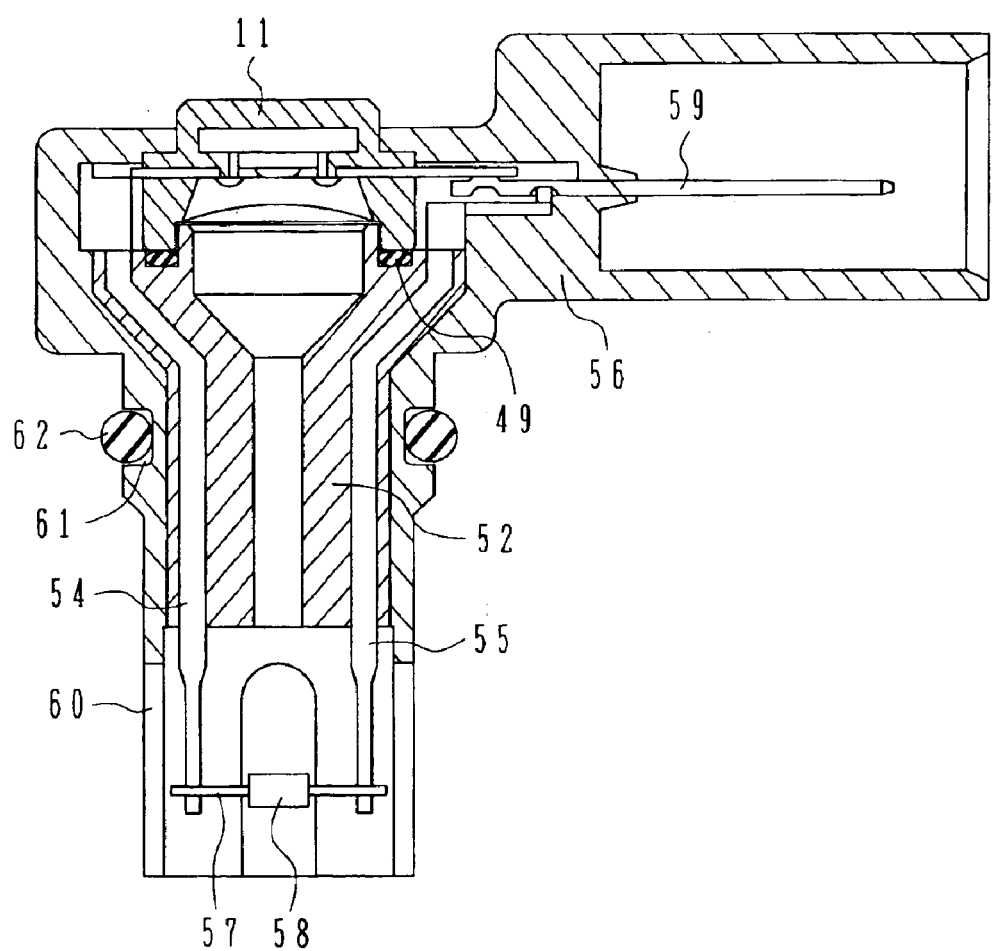
FIG. 5 is a sectional view showing a construction of a semiconductor absolute pressure sensor with an integral temperature sensor according to a fourth embodiment of the present invention.

FIG. 5 is a sectional view showing a construction of a semiconductor absolute pressure sensor with an integral temperature sensor according to a fourth embodiment of the present invention. Note that the same characters as those in FIG. 1 denote the same components.

A sensor unit 11 is the same as the sensor unit, shown in FIG. 1, for detecting absolute pressure.

A pipe 52 is integrally formed beforehand by insert molding with terminals 54, 55 for holding a temperature sensor 58 which converts the temperature of a fluid to be measured into an electric signal. The pipe 52 is made of PBT of such a grade as improving adhesion in multiple molding and has a labyrinth structure including a plurality of projections, not shown, which are formed in a contact surface of the pipe with a PBT resin of an outer case 56 for the purpose of increasing the fusion ability. The terminals 54, 55 are connected to lead terminals 57 of the temperature sensor 58 by welding. Although this embodiment employs a separate temperature sensor, the structure may be modified such that the temperature sensor is integrally formed with the holding terminals or the lead wires beforehand.

The sensor unit 11 is fitted to the pipe 52 serving as a pressure introducing pipe with an O-ring 49 interposed between them. Lead terminals of the sensor unit 11 are connected to connector terminals 59 by welding, and the terminals 54, 55 are also connected to the connector terminals 59 by welding. The connector terminals 59 are constituted as total four terminals, i.e., pressure sensor output, power supply, ground, and temperature sensor output terminals. The temperature sensor and the pressure sensor share the ground terminal. Those assembled components are set in a mold for forming the outer case 56 and subjected to insert molding using a synthetic resin material such as PBT. An O-ring mount groove 61 is formed in a protector 60 of the outer case 56, and an O-ring 62 is fitted to the O-ring mount groove 61. Thus, the semiconductor absolute pressure sensor with the integral temperature sensor is obtained.

The semiconductor absolute pressure sensor with the integral temperature sensor is used for engine control. To directly measure the temperature and the pressure of air sucked into an engine, the protector 60 is directly inserted in and mounted to an intake pipe. The O-ring 62 is provided to ensure hermetic seal in a mounted portion of the O-ring 62. The terminals 54, 55 holding the temperature sensor 53 are exposed in an inner space of the protector 60. Openings for taking in the medium to be measured are formed in a side surface of the pressure introducing pipe at four positions spaced at angular intervals of 90 degrees.

With the above-described structure of this embodiment, it is possible to eliminate the effect of heat applied to the terminals 54, 55 from the wall heated to a high temperature in an area in which the outer case is mounted, and to provide the absolute pressure sensor with the integral temperature sensor, which has a good response in temperature measurement.

Further, since the sensor unit, the pipe, and the outer case can be all made of resin, the total sensor weight can be reduced. Moreover, since the pressure sensor with the integral temperature sensor can be formed of resin by two-stage molding, the sensor size can be further reduced.

It is to be noted that the basic concept of each of the above-described embodiments is included in features set forth in claims, and individual constituent elements (e.g., soldering for connection between the lead terminals and the connector terminals) other than constituent elements set forth in the claims are not restricted at all.

INDUSTRIAL APPLICABILITY

The present invention makes it possible to use a mold for resin molding in common, to cut down the number of components, to reduce the sensor size, and to ensure high reliability.

What is claimed is:

1. A semiconductor pressure sensor comprising:
    a resin-molded sensor unit with a built-in semiconductor chip for converting a pressure change of a fluid to be measured, which is introduced through an introduction hole, into an electric signal;
    a lead member having one end exposed in a connector, said lead member being electrically connected to said semiconductor chip in said sensor unit beforehand;
    a measurement pressure introducing pipe for introducing pressure to said semiconductor chip; and
    an outer integrally formed, synthetic resin material case in which said sensor unit, said lead member, and said measurement pressure introducing pipe have been insert molded between top and bottom portions of said case.

2. A semiconductor pressure sensor according to claim 1, wherein said sensor unit is a sensor unit for measuring absolute pressure.

3. A semiconductor pressure sensor according to claim 1, wherein said sensor unit is a sensor unit for measuring relative pressure.

4. A semiconductor pressure sensor according to claim 3, wherein said sensor unit for measuring absolute pressure has a cap including a film disposed in an introduction hole communicating with atmosphere, said film being able to prevent passage of moisture.

5. A semiconductor pressure sensor according to claim 1, further comprising a sealing member interposed between said pressure introducing pipe and said sensor unit.

6. A semiconductor pressure sensor according to claim 1, wherein an input/output terminal of said sensor unit and said lead member are separate from each other and are electrically connected midway to each other.

7. A semiconductor pressure sensor according to claim 1, wherein a part of said sensor unit is exposed from a part of said outer case.

8. A semiconductor pressure sensor according to claim 1, wherein said semiconductor chip of said sensor unit is disposed over an exposed portion of a reinforcing member with a glass base interposed therebetween, said reinforcing member being insert-molded in a chip case made of synthetic resin while being exposed in part.

9. A semiconductor pressure sensor according to claim 1, wherein said pressure introducing pipe has a passage formed therein in a conical shape or a tapered shape in part.

10. A semiconductor pressure sensor comprising:

a resin-molded sensor unit with a built-in semiconductor chip for converting a pressure change of a fluid to be measured, which is introduced through an introduction hole, into an electric signal;

a lead member having one end exposed in a connector, said lead member being electrically connected to said semiconductor chip in said sensor unit beforehand;

a measurement pressure introducing pipe for introducing pressure to said semiconductor chip;

a temperature sensor for converting a temperature change of the fluid to be measured into an electric signal;

terminals for holding said temperature sensor; and an outer case (56) integrally formed, synthetic resin material case in which said sensor unit, said lead member, and said measurement pressure introducing pipe have been insert molded between top and bottom portions of said case while said terminals and said lead member are electrically joined to each other.

11. A semiconductor pressure sensor according to claim 10, wherein said temperature sensor and said lead terminals are integrally formed of a synthetic resin material with said pressure introducing pipe.

* * * * *